US 009804696B2

(12) United States Patent
Hall

(10) Patent No.: US 9,804,696 B2
(45) Date of Patent: Oct. 31, 2017

(54) USER-INPUT CONTROL DEVICE TOGGLED MOTION TRACKING

(71) Applicant: Microsoft Technology Licensing, LLC, Redmond, WA (US)

(72) Inventor: Michael Anthony Hall, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 45 days.

(21) Appl. No.: 14/588,679

(22) Filed: Jan. 2, 2015

(65) Prior Publication Data
US 2016/0195940 A1 Jul. 7, 2016

(51) Int. Cl.
*G06F 3/033* (2013.01)
*G06F 3/038* (2013.01)
(Continued)

(52) U.S. Cl.
CPC .......... *G06F 3/0383* (2013.01); *A63F 13/213* (2014.09); *A63F 13/24* (2014.09); *A63F 13/428* (2014.09); *G06F 3/017* (2013.01); *G06F 3/033* (2013.01); *G06F 3/0304* (2013.01); *G06F 3/0346* (2013.01); *G06F 3/048* (2013.01);
(Continued)

(58) Field of Classification Search
CPC ...... G06F 3/0383; G06F 3/0346; G06F 3/017; G06F 3/048; G06T 7/0051; G06T 7/004; G06T 17/20; G06T 19/003; A63F 13/20; A63F 13/25
See application file for complete search history.

(56) References Cited

U.S. PATENT DOCUMENTS 5,716,274 A    2/1998  Goto et al.
6,512,511 B2 * 1/2003  Willner .................. A63F 13/06
                                                          345/156
(Continued)

FOREIGN PATENT DOCUMENTS

CN    203447749 U    2/2014

OTHER PUBLICATIONS

Ballestin, Alberto, "Mad Genius joypad takes the concept of two pieces of Sony and closer to reality", Published on: May 13, 2013, Available at: http://es.engadget.com/2013/05/12/mad-genius-mando-captura-de-movimiento/.
(Continued)

*Primary Examiner* — Nicholas Lee
*Assistant Examiner* — Gerald Oliver
(74) *Attorney, Agent, or Firm* — Alleman Hall Creasman & Tuttle LLP

(57) ABSTRACT

On a computing system, a method includes receiving a depth video, producing a machine-understandable model of a player interacting with a user-input control device from the depth video, controlling operation of the computing system without influence of the machine-understandable model responsive to receiving a control signal from a user-input control device while the user-input control device is in an attached state, and controlling operation of the computing system with influence of the machine-understandable model responsive to receiving the control signal from the user-input control device while the user-input control device is in a detached state.

20 Claims, 9 Drawing Sheets

(51) Int. Cl.
*G06F 3/01* (2006.01)
*G06F 3/0346* (2013.01)
*G06F 3/048* (2013.01)
*G06T 17/20* (2006.01)
*G06T 19/00* (2011.01)
*G06F 3/03* (2006.01)
*A63F 13/24* (2014.01)
*A63F 13/213* (2014.01)
*A63F 13/428* (2014.01)
*G06T 7/50* (2017.01)
*A63F 13/211* (2014.01)
*A63F 13/235* (2014.01)

(52) U.S. Cl.
CPC ............... *G06T 7/50* (2017.01); *G06T 17/20* (2013.01); *G06T 19/003* (2013.01); *A63F 13/211* (2014.09); *A63F 13/235* (2014.09)

(56) References Cited

U.S. PATENT DOCUMENTS

| | | | |
|---|---|---|---|
| 8,298,084 B2 * | 10/2012 | Yee | A63F 13/06 463/37 |
| 8,497,902 B2 | 7/2013 | Osman | |
| 8,535,155 B2 | 9/2013 | Koizumi et al. | |
| 8,660,303 B2 | 2/2014 | Izadi et al. | |
| 2009/0005164 A1 * | 1/2009 | Chang | A63F 13/06 463/37 |
| 2009/0209343 A1 | 8/2009 | Foxlin et al. | |
| 2011/0195782 A1 | 8/2011 | Mao et al. | |
| 2012/0088582 A1 * | 4/2012 | Wu | A63F 13/06 463/37 |
| 2012/0257797 A1 * | 10/2012 | Leyvand | G06K 9/00221 382/118 |
| 2012/0302347 A1 * | 11/2012 | Nicholson | A63F 13/06 463/37 |
| 2014/0139629 A1 | 5/2014 | Baiyya et al. | |
| 2014/0327377 A1 | 11/2014 | Rider | |
| 2014/0342830 A1 | 11/2014 | Musick, Jr. et al. | |

OTHER PUBLICATIONS

Seah, Lennard, "First Look: Razer Hydra PC Gaming Motion Sensing", Published on: Aug. 21, 2011, Available at: http://vr-zone.com/articles/first-look-razer-hydra-pc-gaming-motion-sensing-controller/13344.html.

Shah, Jay, "How Good is Sony's PS3 Move Against Nintendo Wii and Microsoft Kinect", Published on: Aug. 20, 2010, Available at: http://blogote.com/opinion/good-sonys-ps3-move-against-nintendo-wii-and-microsoft-kinect-controller/7615/.

Welsh, Oli, "The end of gimmicks", Published on: May 17, 2014, Available at: http://www.eurogamer.net/articles/2014-05-17-the-end-of-gimmicks.

Wong, Raymod, "Xbox 360 Wireless Speed Wheel review: The Wii wheel all grown up", Published on: Nov. 21, 2011, Available at: http://www.dvice.com/archives/2011/11/review_wireless.php.

Humphries, Matthew, "Smartphone joystick converts camera to input device", Published on: Apr. 2, 2012 Available at: http://www.geek.com/games/smartphone-joystick-converts-camera-to-input-device-14798271.

ISA European Patent Office, International Search Report and Written Opinion issued in Application No. PCT/US2015/067750, dated Mar. 22, 2016, WIPO, 14 pages.

IPEA European Patent Office, Second Written Opinion Issued in PCT Application No. PCT/US2015/067750, dated Dec. 19, 2016, WIPO, 8 pages.

* cited by examiner

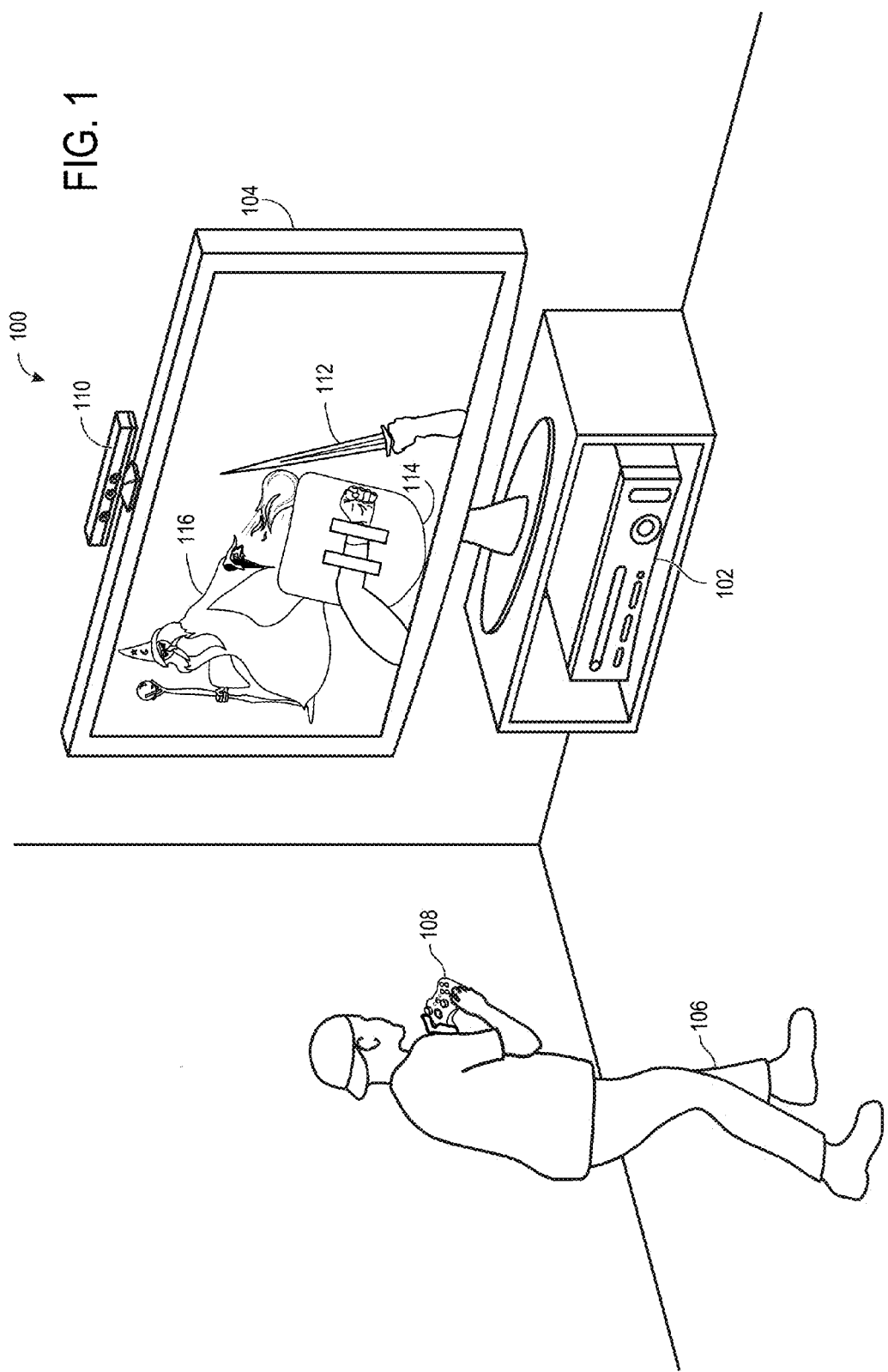

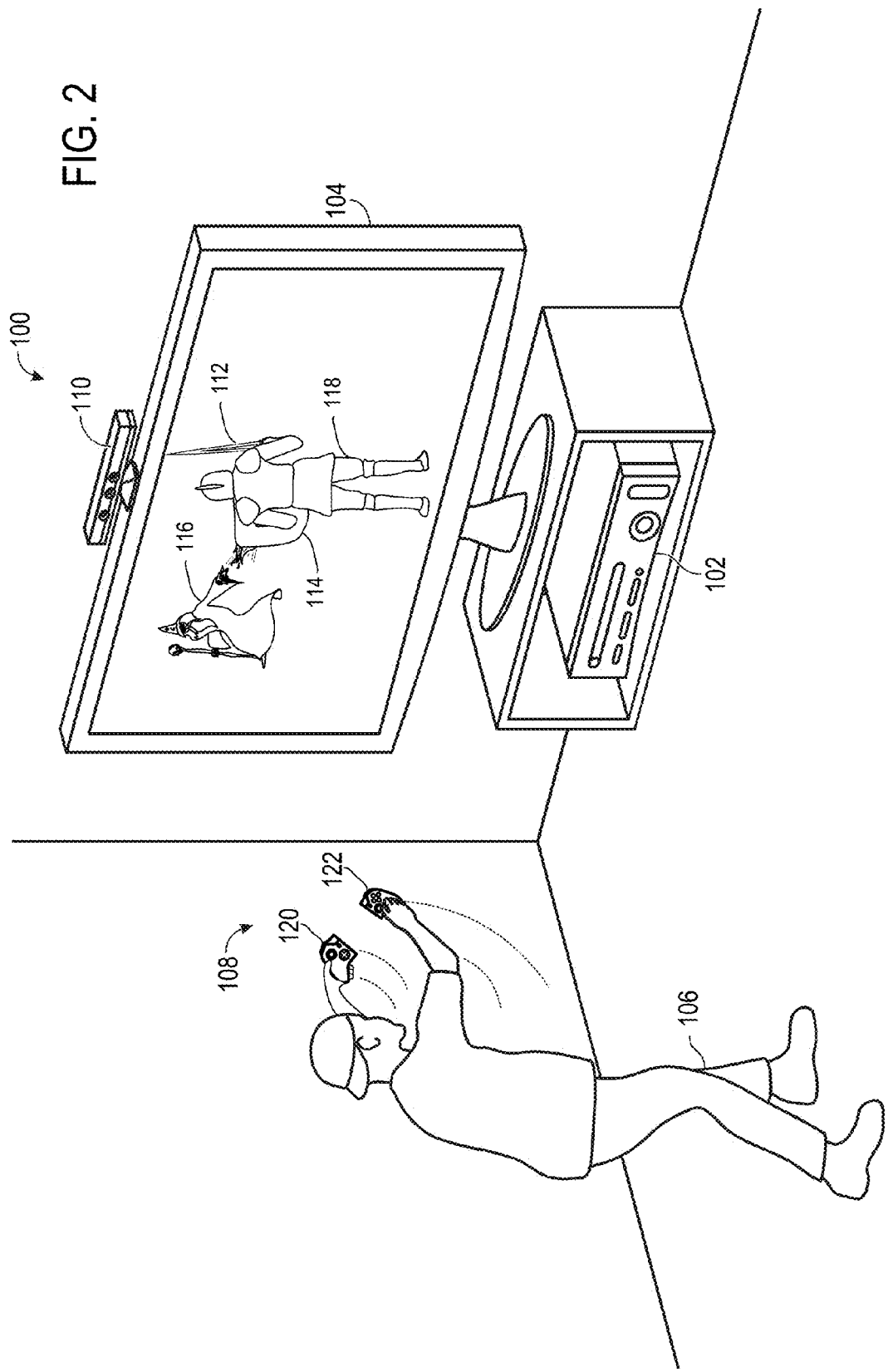

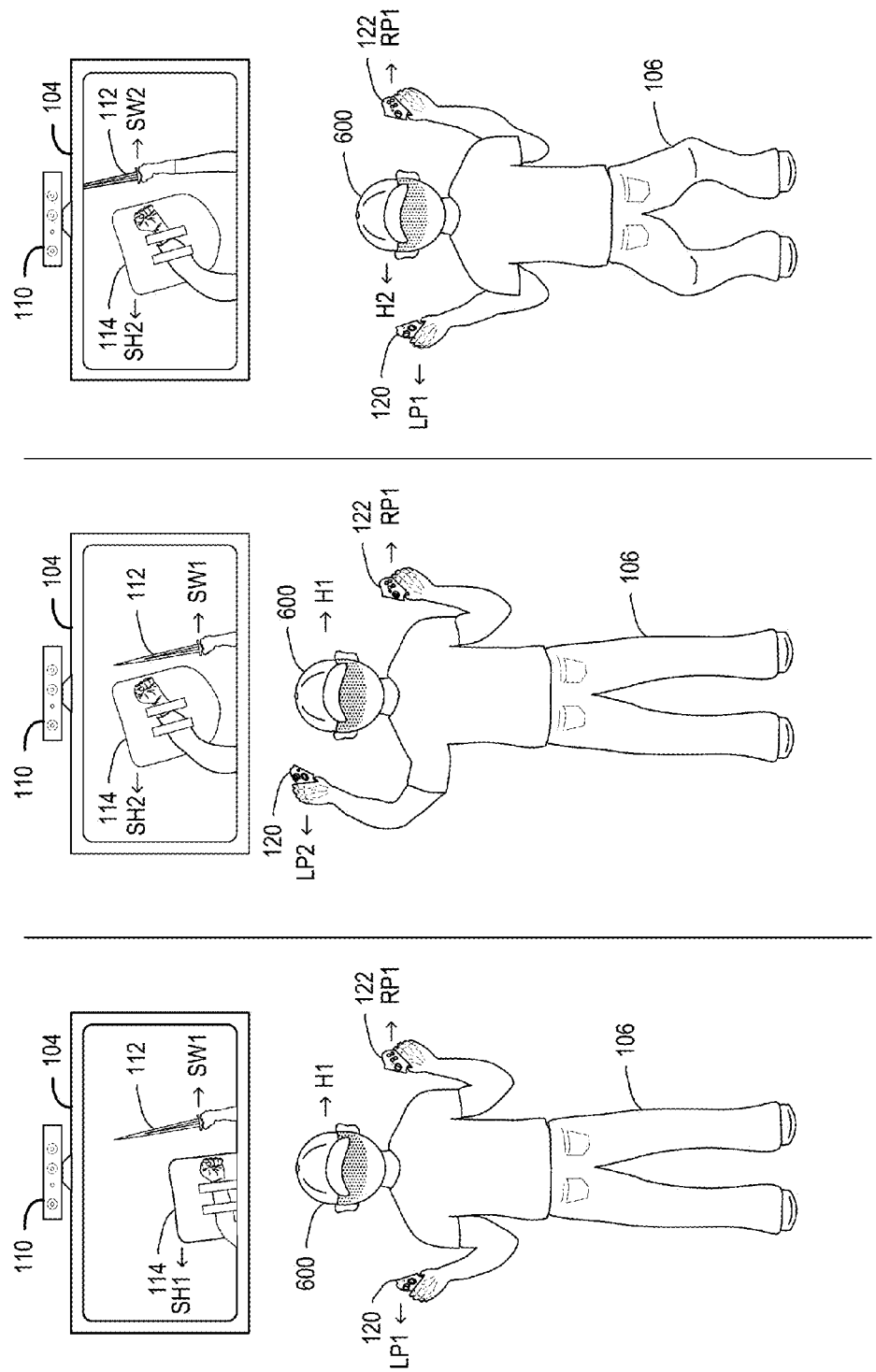

USER-INPUT CONTROL DEVICE TOGGLED MOTION TRACKING

BACKGROUND

A computing system may be controlled through various forms of user input. In some cases, user input may be provided via a user-input control device, such as a video game controller. In some cases, user input may be provided via motion tracking of a human subject.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A depth video is received. A machine-understandable model of a player interacting with a user-input control device is produced from the depth video. Operation of a computing system is controlled without influence of the machine-understandable model responsive to receiving a control signal from a user-input control device while the user-input control device is in an attached state. Operation of the computing system is controlled with influence of the machine-understandable model responsive to receiving the control signal from the user-input control device while the user-input control device is in a detached state.

BRIEF DESCRIPTION OF THE DRAWINGS

FIG. 1 shows an example natural user input (NUI) system imaging a human subject and a user-input control device in an attached state.

FIG. 2 shows the NUI system of FIG. 1 imaging the human subject and the user-input control device in a detached state.

FIGS. 6-8 show example scenarios in which operation of a computing system is controlled with influence of a 3D position of a user-input control device relative to a 3D position of a skeletal model of a human subject.

DETAILED DESCRIPTION

Figure 5:
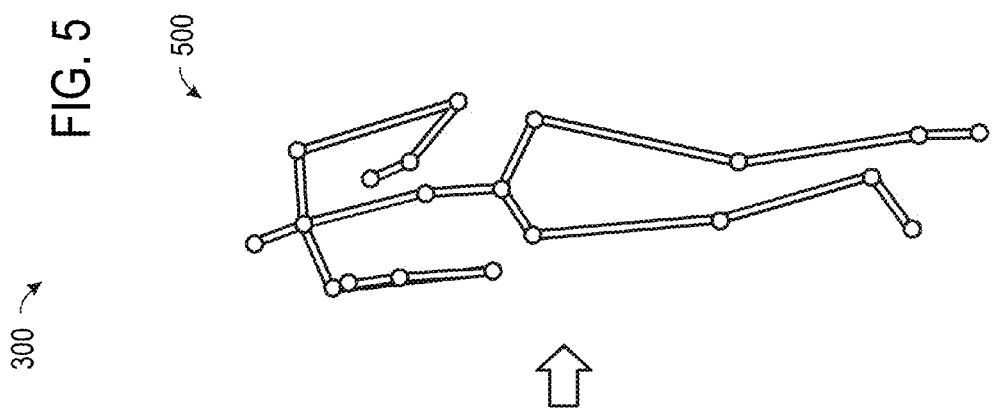
FIG. 5 shows a graphical representation of an example skeletal model derived from the depth map of FIG. 4.

The present disclosure relates to an approach for controlling operation of a computing system as a function of an operating state of a user-input control device. More particularly, the user-input control device may be configured to be separable into two (or more) portions. In an attached state, the portions of the user-input control device may be coupled together to operate as a single device. In a detached state, the portions of the user-input control device may be separated, and each portion may be operated and/or moved separately. The user-input control device may be toggled between the attached state and the detached state to control operation of a computing system differently.

Further, the approach may include producing a machine-understandable model of a player interacting with the user-input control device. In one example, the machine-understandable model may be produced by performing skeletal modeling on a depth video to produce a skeletal model of a player interacting with a user-input control device. Operation of the computing system may be controlled with or without influence of the skeletal model based on the separation state of the user-input control device. In one example, operation of the computing system is controlled without influence of the skeletal model while the user-input control device is in the attached state. In another example, operation of the computing system is controlled with influence of the skeletal model while the user-input control device is in the detached state.

The above described approach may allow a player to provide conventional user input via input mechanisms (e.g., via joysticks, triggers, and buttons) of the user-input control device while the user-input control device is in the attached state. Further, the above described approach may allow a player to smoothly transition to providing motion-based user input by changing the user-input control device to the detached state. The ability to smoothly and quickly transition between different user-input modalities by changing the state of the user-input control device may allow a player to select a user-input modality that is most suitable for a given scenario without interruption.

FIGS. 1 and 2 show a nonlimiting example of a natural user input (NUI) system 100. The NUI system 100 includes a computing system 102 depicted in the illustrated example as an entertainment computing system configured to play a variety of different games, other media content, and/or control or manipulate non-game applications. A display 104 may be in communication with the computing system 102. The display 104 may be configured to present video to human subjects, such as a game player 106.

The game player 106 may provide user input to the computing system 102 via a user-input control device 108. The user-input control device 108 is depicted in the illustrated example as a wireless controller or gamepad having a conventional layout of input mechanisms including analog joysticks, analog triggers, a directional pad, and Boolean buttons. The user-input control device 108 may be configured to be separable into two (or more) portions (e.g., a right portion seperably holdable by a right hand, and a left portion seperably holdable by a left hand). Further, each portion of the user-input control device 108 may be operable to provide user input while in the detached state. For example, each portion of the user-input control device 108 may send control signals to the computing system 102 responsive to receiving user input to input mechanisms on that portion. In some implementations, the user-input control device 108 may be configured to send a signal indicating a separation state (e.g., an attached or a detached state) of the user-input control device 108 to the computing system 102.

In some implementations, each portion of the user-input control device may include position tracking componentry, such as accelerometers, gyroscopes, inertial measurement units, or other components to track a position of the portion of the user-input control device. Further, information produced by such componentry may be sent to the computing system 102 for position tracking purposes.

A tracking device 110 may be configured to image or otherwise track (e.g., via audio) one or more human subjects, such as the game player 106. Further, in some implementations, the tracking device 110 may be configured to track the user-input control device 108. For example, each portion of the user-input control device 108 may include retro-reflective markers that may be imaged by the tracking device 110 and recognized by the computing system 102 to spatially resolve a three-dimensional (3D) position of each portion of the user-input control device 108. In another example, each portion of the user-input control device may include an active light source (e.g., an infrared light source) that may be imaged by the tracking device 110 and recognized by the computing system 102 to spatially resolve a 3D position of each portion of the user-input control device 108.

In some such implementations, the computing system 102 may be configured to determine the separation state of the user-input control device 108 based on the 3D positions of different portions of the user-input control device 108. For example, the detached state may be determined responsive to a distance between the 3D positions of the different portions being greater than a threshold distance.

In one example, the tracking device 110 may include a depth camera, a visible light (e.g., RGB color) camera, an infrared camera, a microphone, and/or other sensors configured to track observed human subjects. In some implementations, the infrared camera may be part of a depth sensor of the tracking device 110. In one example, the depth camera may be a structured-light depth camera. In another example, the depth camera may be a time-of-flight depth camera. In one example, the tracking device 110 may include two or more cameras that act as a "stereo depth camera." In some implementations, depth may be determined using another approach, such as estimating depth from a standard infrared image produced by a standard infrared camera while the scene is illuminated with unstructured infrared light that is not phase or amplitude modulated.

FIG. 1 shows a scenario in which the user-input control device 108 is in the attached state, and the game player 106 controls presentation of a video game via the display 104 by providing user input to conventional input mechanisms of the user-input control device 108. In particular, the display 104 presents a first-person perspective of a knight (118 shown in FIG. 2) holding a sword 112 and a shield 114. Furthermore, the display 104 presents an opponent avatar 116 in the form of a wizard.

In the illustrated example, while the user-input control device 108 is in the attached state, the position of the sword 112 and the shield 114 may be controlled via input mechanisms of the user-input control device 108 without influence of motion tracking (e.g., a skeletal model of the game player) via the tracking device 110. For example, the game player 106 may manipulate the sword 112 and the shield 114 by pressing a Boolean button or manipulating an analog joystick of the user-input control device 108. In this modality, the position of the control device 108 relative to the user and the absolute 3D position of the controller in the environment does not influence the positions of the shield or the sword.

FIG. 2 shows a scenario in which the user-input control device 108 is in the detached state in which a first portion 120 is separated from a second portion 122. While the user-input control device 108 is in the detached state, the movements of the game player 106 are interpreted as operations that can be used to manipulate the video game being executed by the computing system 102. In other words, the game player 106 may use his movements to control the video game. For example, the game player 106 may move his left arm in physical space to move the shield 114 in virtual space. Likewise, the game player 106 may move his right arm in physical space to move the sword 112 in virtual space. The movements of the game player 106 may be interpreted as virtually any type of game control. In such implementations, operation of the computing system 102 may be controlled without influence of control signals associated with the input mechanisms of the user-input control device 108 while the user-input control device 108 is in the detached state. Instead, user input may be strictly derived from gestures performed by the game player 106.

In other implementations, control signals associated with the input mechanisms of the user-input control device 108 may be considered in combination with motion tracking to control operation of the computing system 102 while the user-input control device 108 is in the detached state. For example, the game player 106 may change a position of his left arm to block a fireball with the shield 114 and the game player 106 may press a Boolean button on the user-input control device 108 to initiate an attacking motion with the sword 112. In another example, the game player 106 may change a position of his right arm to change a type of attacking motion performed with the sword 112 responsive to pressing a Boolean button. For example, the game player 106 may move his right arm sideways to perform a swipe attack that is initiated by pressing a button. As another example, the game player 106 may move his arm up and down to perform a chop attack that is initiated by pressing the button.

In some implementations, a perspective of a virtual scene presented via the display 104 may be changed responsive to a change of state of the user-input control device. For example, in FIG. 1, the video game is shown from a first-person perspective while the user-input control device is in the attached state. Furthermore, in FIG. 2, the video game is shown from a third-person perspective while the user-input control device 108 is in the detached state. For example, the perspective of the virtual scene of the video game may change responsive to a change of state of the user-input control device in order to accommodate a change in modality of user input. In particular, the video game may be displayed from the third-person perspective while the user-input control device 108 is in the detached state to allow the game player 106 to observe feedback from motion-based control of the knight 118 in the video game. In other words, the game player 106 may perform moves in physical space and view feedback of those moves performed by the knight 118 in virtual space in order to provide accurate motion-based user input.

In some implementations, separating the user-input control device may trigger or toggle activation of the tracking device 110 to track the player and/or the portions of the user-input control device. By permitting toggling of the tracking device based on the user-input control device state, a player may be allowed to provide motion input as much or as little as desired while playing a game. Such a feature reduces a likelihood of a player becoming fatigued while playing a game over an extended period, while still offering alternative input modalities to enhance interaction with the game when desired.

In some implementations, separating the user-input control device may signal to a game that a player desires to enter a mini-game mode. For example, stealth games often use analog sticks to pick locks on safes or doors. Separating the user-input control device may trigger display of a lock-picking screen and toggle a lock-picking button mapping scheme on the user-input control device that can be used to pick the lock. Attaching the user-input control device may trigger display of a standard 1st person or 3rd person gameplay mode and toggle the previous button mapping scheme on the user-input control device.

In some implementations, separating the user-input control device may allow access to information that is traditionally accessed through navigation of system menus. For example, bringing up a map of a level in a game may be a ubiquitous task that may frustratingly break a stream of gameplay. Accordingly, changing a separation state of the user-input control device may trigger display of a map or other menu during gameplay. In other words, the change in separation state may act as a shortcut to display the map. Such a feature may provide a more natural action that is less intrusive than pausing game play to navigate various system menus.

Virtually any controllable aspect of an operating system, application, or other computing product may be controlled by movements of a human subject. The illustrated medieval combat scenario is provided as an example, but is not meant to be limiting in any way. To the contrary, the illustrated scenario is intended to demonstrate a general concept, which may be applied to a variety of different applications without departing from the scope of this disclosure.

The example NUI system 100 is nonlimiting. A variety of different computing systems may utilize NUI information for a variety of different purposes without departing from the scope of this disclosure. For example, the NUI information may be used to perform skeletal modeling on one or more human subjects.

Figure 4:
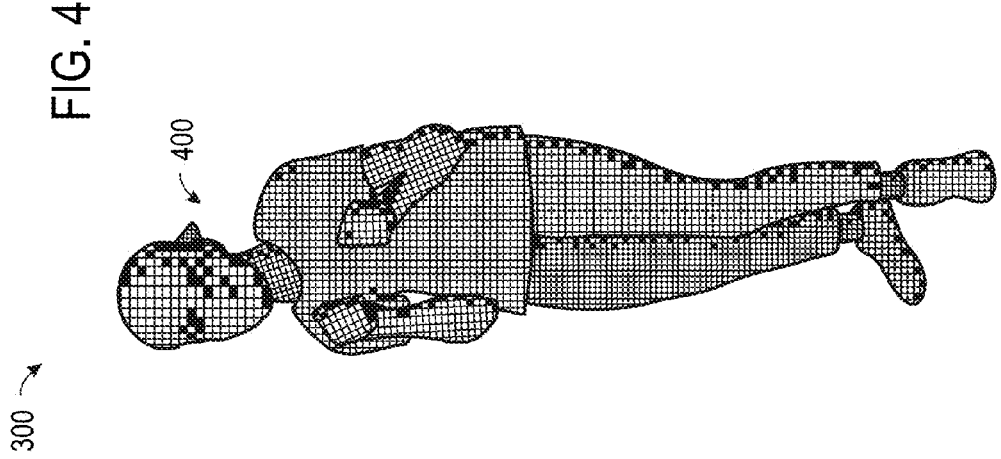
FIG. 4 shows a graphical representation of an example depth map derived from the infrared video of FIG. 3.
Figure 3:
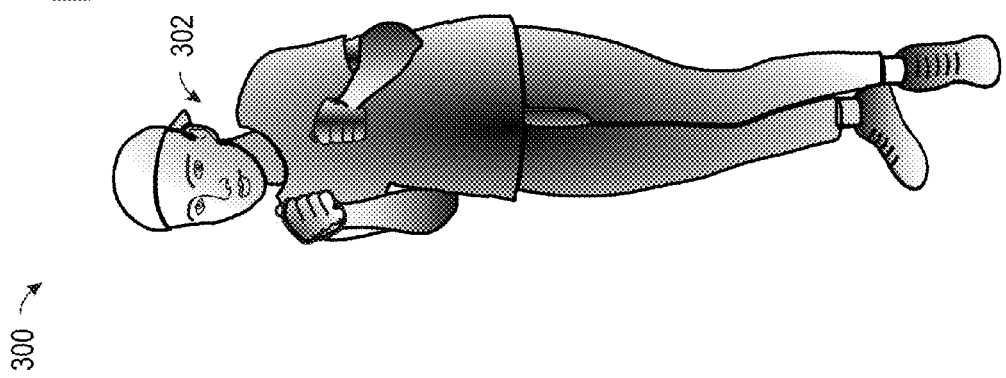
FIG. 3 shows a graphical representation of an example infrared video of the human subject of FIG. 1.

FIGS. 3-5 graphically show a simplified skeletal modeling pipeline 300 that may be executed by the computing system 102 to track one or more human subjects and/or other objects (e.g., portions of a user-input control device). For simplicity of explanation, skeletal modeling pipeline 300 is described with reference to the NUI system 100 of FIGS. 1 and 2. However, the skeletal modeling pipeline 300 may be implemented on any suitable computing system without departing from the scope of this disclosure. For example, skeletal modeling pipeline 300 may be implemented on the computing system 1400 of FIG. 14. Furthermore, skeletal modeling pipelines that differ from skeletal modeling pipeline 300 may be used without departing from the scope of this disclosure.

FIG. 3 shows an example graphical representation of an infrared image 302 of the game player 106 from a perspective of an infrared camera of the tracking device 110. The infrared image 302 is simplified to show a user-only portion of a representative image frame. While FIG. 3 depicts a single image frame, it is to be understood that a human subject may be continuously observed and modeled. Further, any suitable type of video may be used to observe and model a human subject.

FIG. 4 shows an example graphical representation of a depth map 400 of the game player 106 from a perspective of a depth camera of the tracking device 110. The depth map 400 may be derived from infrared video including the infrared image 302. The depth map 400 is simplified to show a user-only portion of a representative depth image frame. The depth map 400 may include the depths of the various surfaces of the game player 106 relative to the depth camera of the tracking device 110. While FIG. 4 depicts a single depth map, it is to be understood that a human subject may be continuously observed and modeled.

Each depth map may include a plurality of depth pixels. Each depth pixel may indicate a depth of a surface in the scene that is imaged by that pixel. For example, the depth may be represented as a 3D position (e.g., x/y/z coordinates or pixel address +z coordinate). Similar coordinates may be recorded for every pixel of the depth camera. The coordinates for all of the pixels collectively constitute a depth map. The coordinates may be determined in any suitable manner without departing from the scope of this disclosure. For example, time of flight, structured light, or stereo imaging may be used to assess the depth value for each of a plurality of depth pixels.

As part of the skeletal modeling pipeline 300, the computing system 102 may execute a previously-trained, machine-learning module to perform skeletal modeling on the depth video (e.g., depth map 400). The machine-learning module may be previously trained on ground truths to classify input data. For example, the ground truths may include a prior-trained collection of known poses. In other words, during a supervised training phase, a variety of different people may be observed in a variety of different poses, and human trainers may provide ground truth annotations labeling different machine-learning classifiers in the observed data. The observed data and annotations may be used to generate one or more machine-learning algorithms that map inputs (e.g., observation data from a tracking device) to desired outputs (e.g., body part indices for relevant pixels).

The previously-trained, machine-learning module may be configured to perform skeletal modeling on the depth video to produce a skeletal or other machine-readable body model. In one example, the previously-trained, machine-learning module may be configured to analyze the depth pixels of the depth video in order to determine what part of the human subject's body each such pixel is likely to image. A variety of different body-part assignment techniques can be used to assess which part of a human subject's body a particular pixel is likely to image. Each pixel may be assigned a body part index as classified by the previously-trained, machine-learning module. For example, the body part index may include a discrete identifier, confidence value, and/or body part probability distribution indicating the body part, or parts, to which that pixel is likely to image. Body part indices may be determined, assigned, and saved in any suitable manner without departing from the scope of this disclosure. The collection of body parts may comprise a skeletal model.

FIG. 5 shows a graphical representation of a virtual skeleton 500 (also referred to as a skeletal model) that serves as a machine-readable representation of the game player 106. The virtual skeleton 500 may include various skeletal joints or other features corresponding to actual joints of a human subject, centroids of the human subject's body parts, terminal ends of a human subject's extremities, and/or points without a direct anatomical link to the human subject. Each joint has at least three degrees of freedom (e.g., world space x, y, z). As such, each joint of the virtual skeleton is defined with a 3D position. The virtual skeleton 500 may optionally include a plurality of virtual bones. The various skeletal bones may extend from one skeletal joint to another and may correspond to actual bones, limbs, or portions of bones and/or limbs of a human subject. The skeletal model 500 may track motion of the game player 106 throughout the depth video.

In some implementations, the skeletal modeling pipeline 300 may be configured to track and model objects other than human subjects, such as the user-input control device 108. For example, the user-input control device 108 may be imaged and modeled with respect to the human subject 106. More particularly, each of the first portion 120 and the second portion 122 may be individually tracked and modeled. As one example, portions 120 and 122 may include different retro-reflective tags and/or emit different patterns of light so that the portions may be distinguished from one another and individually located in three-dimensional space.

Such modeling may enable the computing system 102 to spatially resolve a 3D position of the user-input control device (or 3D positions of portions of the user-input control device) relative to a 3D position of the skeletal model in the depth video provided by the tracking device 110. Furthermore, operation of the computing system 102 may be controlled with influence of the 3D position of the user-input control device relative to the 3D position of the skeletal model.

In some implementations, the pipeline 300 may be configured to produce a machine-understandable model of a player in a manner other than by producing a skeletal model. In one example, the pipeline may model just particular human identifiable features (e.g., hands, arms, or torso). In another example, the pipeline may track fiducial markers obtained through analysis of the depth image that indicate some form of orientation of a human body pose. In another example, the machine-understandable model may be a point cloud including a plurality of points or shapes that model a volume of a human body. In yet another example, a wire grid model may be used.

FIGS. 6-8 show example scenarios in which operation of a computing system is controlled with influence of a 3D position of a user-input control device relative to a 3D position of a skeletal model of a human subject. In the depicted scenarios, the user-input control device is in a detached state with the first portion 120 being held in the left hand of the game player 106 and the second portion 122 being held in the right hand of the game player.

The tracking device 110 images the game player 106 as well as the first portion 120 and the second portion 122 of the user-input control device, such that the 3D position of the first portion and the 3D position of the second portion are spatially resolved relative to the 3D position of a skeletal model of the game player 106. In other words, the 3D positions of the first and second portions of the user-input control device are tracked relative to the position of the game player. The 3D positions of the portions of the user-input control device may be spatially resolved relative to the 3D position of any portion of the game player. In the depicted example, the 3D positions of the first and second portions of the user-input control device are spatially resolved relative to a 3D position of the game player's head 600.

The display 104 presents a first-person perspective of a knight 118 (shown in FIG. 2) in a virtual scene. The knight 118 is holding a sword 112 in his right hand and a shield 114 in his left hand. The knight 118 is a playable avatar that is controlled by the game player 106. In particular, while the user-input control device 108 is in the detached state, the game player 106 can change a position of the first portion 120 in physical space to correspondingly change a virtual position of the shield 114 in the virtual scene. Likewise, the game player 106 can change a position of the second portion 122 in physical space to correspondingly change a virtual position of the sword 112 in the virtual scene. Such changes in virtual position may be derived from changes in physical position of the user-input control device relative to the game player's head.

FIG. 6 show the game player 106 holding the first portion 120 at a 3D position LP1 and the second portion 122 at a 3D position RP1. Further, the game player's head 60 is positioned at a 3D position H1. Correspondingly, the sword 112 is positioned at a virtual position SW1 and the shield 114 is positioned at a virtual position SH1 in a virtual scene presented by the display 104.

FIG. 7 shows a scenario where the game player 106 maintains his head 600 at the 3D position H1 and raises his left hand to move the first portion 120 to a different 3D position LP2 that is higher than the 3D position LP1. The 3D position LP2 of the first portion 120 is also higher than the 3D position H1 of the game player's head 600. Further, the second portion 122 remains at the 3D position RP1. Responsive to the first portion 120 being raised to the 3D position LP2, the shield 114 is raised to a virtual position SH2 that is higher than the virtual position SH1. Meanwhile, the sword 112 maintains the same virtual position SW1, because the 3D position RP1 does not change relative to the 3D position H1 of the game player's head 600.

FIG. 8 shows a scenario where the game player lowers his head 600 to a 3D position H2 that is lower than the 3D position H1. Further, the game player 106 holds the first portion 120 at the 3D position LP1 and the second portion 122 at the 3D position RP1. Responsive to the game player's head 600 lowering to the 3D position H2, the shield 114 may be raised to the virtual position SH2 and the sword 112 may be raised to a virtual position SW2 that is higher than the virtual position SW1.

Although the first and second portions of the user-input device did not change position between the scenarios depicted in FIG. 6 and FIG. 8, a change in the virtual positions of the sword and shield did occur due to the 3D positions of the first and second portions being spatially resolved in a relative manner. In particular, the sword and shield moved up in virtual position in FIG. 8, because a distance between the game player's head and each of the first and second portions of the user-input device were reduced.

By tracking the 3D position of the user-input device relative to the 3D position of the game player as described above, various virtual scenarios may be achieved through physical motion of the game player without a change in position of the user-input control device. For example, along the lines of the scenario described above, the game player may be able to achieve a virtual blocking move with the shield by lowering his head to the level of his left arm. As another example, the game player may be able peer around the shield while the shield is raised by shifting his head sideways without changing a position of his left arm.

In some implementations, operation of the computing system 102 may be controlled with influence of the 3D position of the user-input control device relative to the 3D position of the skeletal model while the user-input control device is in the detached state. Conversely, operation of the computing system 102 may be controlled without influence of the 3D position of the user-input control device relative to the 3D position of the skeletal model while the user-input control device is in the attached state. Instead, operation of the computing system 102 may be controlled based on only user input provided to input mechanisms of the user-input control device 108 while the user-input control device is in the attached state.

In other implementations, operation of the computing system 102 may be controlled with influence of the 3D position of the user-input control device relative to the 3D position of the skeletal model while the user-input control device is in either the attached state or the detached state. In other words, the relative 3D position of the user-input control device 108 may be used to control operation of the computing system 102 regardless of the state of the user-input control device.

In some such implementations, a change of state of the user-input control device 108 may trigger other changes in operation of the computing system. For example, switching between the attached state and the detached state may trigger a change in a virtual scene presented via the display 104 between a first-person perspective and a third-person perspective. As another example, switching between the attached state and the detached state may trigger different mappings of operations to input mechanisms of the user-input control device 108. For example, a sword swipe operation may be mapped to a Boolean button while the user-input control device is in the attached state, and a shield raising operation may be mapped to that same Boolean button while the user-input control device in the detached state.

In still other implementations, the absolute, not relative, 3D positions of the first and second portions of the user-input control device may be spatially resolved and used as control parameters.

In some implementations, different operations may be mapped to input mechanisms of the user-input control device based on an operating state of the user-input control device. FIGS. 9-12 show example scenarios in which different operations are performed depending on an operating state of a user-input control device.

Figure 9:
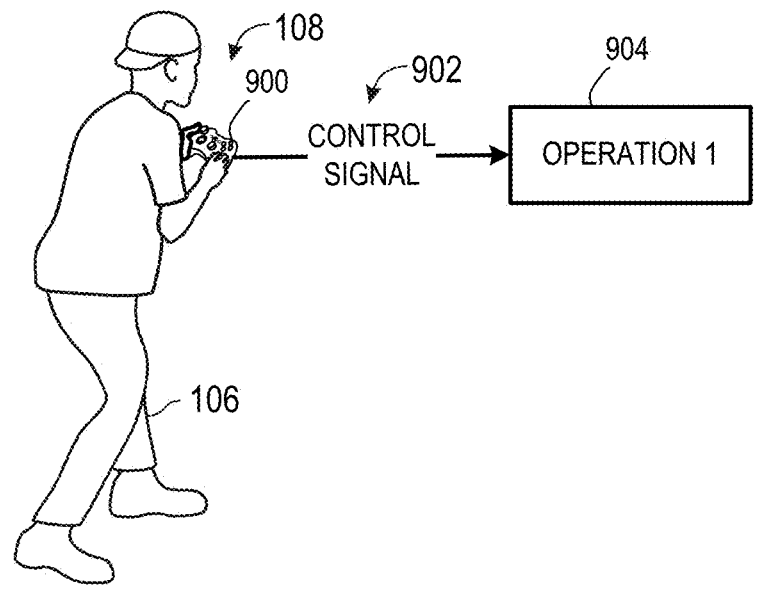
FIGS. 9-12 show example scenarios in which different operations are performed based on an operating state of a user-input control device.

FIG. 9 shows the user-input control device 108 in an attached state. The game player 106 provides user input to an input mechanism 900 (e.g., a Boolean button) of the user-input control device 108 that generates a control signal 902 associated with that input mechanism. The control signal 902 may be sent to the computing system 102. The computing system 102 may be configured to perform a first operation 904 responsive to receiving the control signal 902 while the user-input control device 108 is in an attached state. In the depicted example, the first operation 904 may be mapped to the input mechanism 900 based on the user-input control device 108 being in the attached state. Correspondingly, a first set of operations may be mapped to a plurality of input mechanisms of the user-input control device 108 based on the user-input control device being in the attached state.

Figure 10:
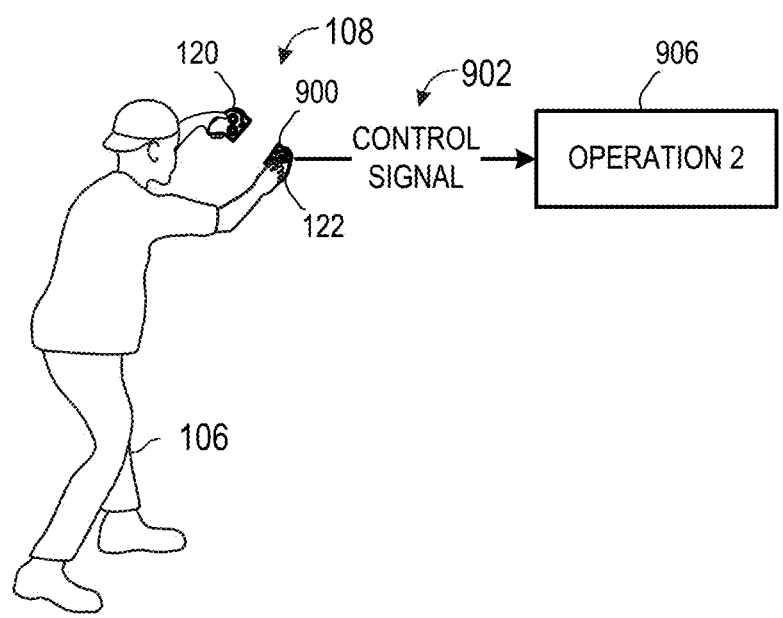

FIG. 10 shows the user-input control device 108 in a detached state with the first portion 120 and the second portion 122 being held by the game player 106. The game player 106 provides user input to the input mechanism 900 of the user-input control device 108 that generates the control signal 902 associated with that input mechanism. The control signal 902 may be sent to the computing system 102. The computing system 102 may be configured to perform a second operation 906 responsive to receiving the control signal 902 while the user-input control device 108 is in the detached state. The second operation 906 may be different than the first operation 904.

In the depicted example, the second operation 906 may be mapped to the input mechanism 900 based on the user-input control device 108 being in the detached state with the game player 106 holding the first portion 120 and the second portion 122 of the user-input control device 108. Correspondingly, a second set of operations may be mapped to a plurality of input mechanisms of the user-input control device 108 based on the user-input control device being in the detached state with the game player 106 holding the first portion 120 and the second portion 122 of the user-input control device 108. The computing system 102 is able to recognize this particular operating state of the user-input control device 108, because the computing system separately tracks and models the game player 106, the first portion 120 of the user-input control device, and the second portion 122 of the user-input control device.

Figure 11:
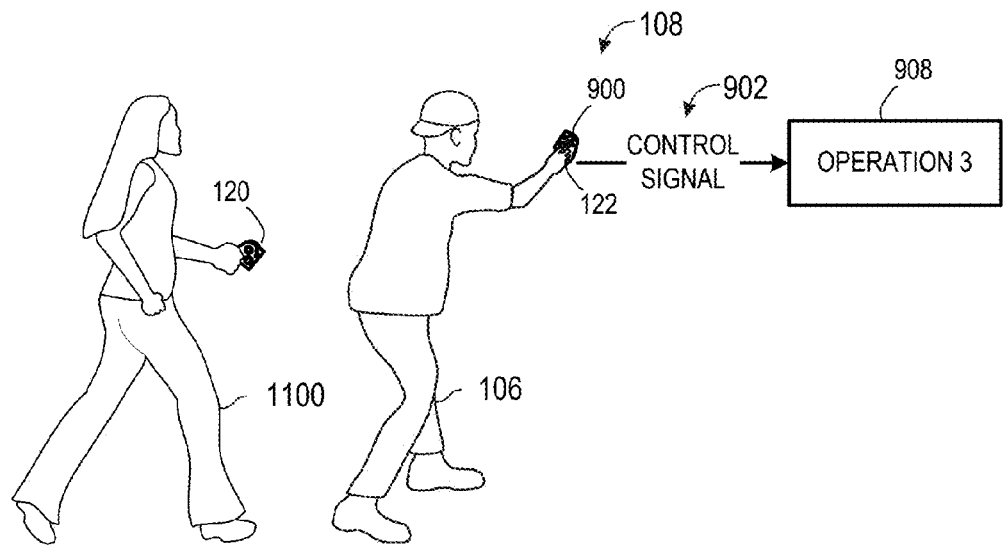

FIG. 11 shows the user-input control device 108 in a detached state with the first portion 120 being held by a second game player 1100 and the second portion 122 being held by the game player 106. The game player 106 provides user input to the input mechanism 900 of the second portion 122 of the user-input control device 108 that generates the control signal 902 associated with that input mechanism. The control signal 902 may be sent to the computing system 102. The computing system 102 may be configured to perform a third operation 908 responsive to receiving the control signal 902 while the user-input control device 108 is in the detached state with the game player 106 holding the second portion 122 and the second game player 1100 holding the first portion 120. The third operation 908 may be different from the first operation 904 and the second operation 906.

In the depicted example, the third operation 908 may be mapped to the input mechanism 900 based on the user-input control device 108 being in the detached state with the second portion 122 being held by the game player 106 and the first portion 120 being held by a different game player (e.g., the second game player 1100). Correspondingly, a third set of operations may be mapped to a plurality of input mechanisms of the user-input control device 108 based on the user-input control device being in the detached state with the second portion 122 being held by the game player 106 and the first portion 120 being held by the second game player 1100. The computing system 102 is able to recognize this particular operating state of the user-input control device 108, because the computing system separately tracks and models the game player 106, the second game player 1100, the first portion 120 of the user-input control device, and the second portion 122 of the user-input control device.

Figure 12:
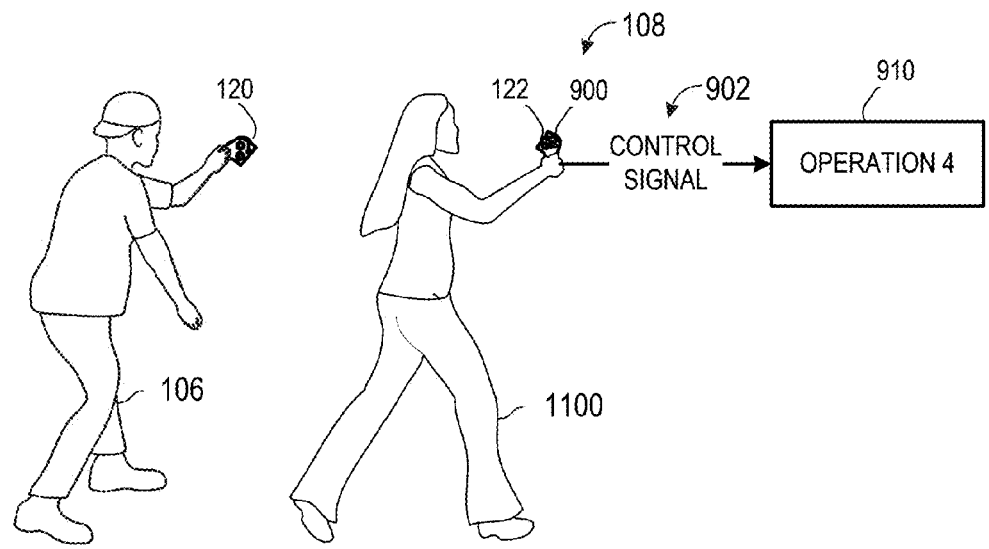

FIG. 12 shows the user-input control device 108 in a detached state with the first portion 120 being held by the game player 106 and the second portion 122 being held by the second game player 1100. The second game player 1100 provides user input to the input mechanism 900 of the second portion 122 of the user-input control device 108 that generates the control signal 902 associated with that input mechanism. The control signal 902 may be sent to the computing system 102. The computing system 102 may be configured to perform a fourth operation 910 responsive to receiving the control signal 902 while the user-input control device 108 is in the detached state with the second game player 1100 holding the second portion 122 and the game player 106 holding the first portion 120. The fourth operation 910 may be different from the first operation 904, the second operation 906, and the third operation 910.

In the depicted example, the fourth operation 910 may be mapped to the input mechanism 900 based on the user-input control device 108 being in the detached state with the second game player holding the second portion 122 and a game player (e.g., game player 106) holding the first portion 120. Correspondingly, a fourth set of operations may be mapped to a plurality of input mechanisms of the user-input control device 108 based on the user-input control device being in the detached state with the second game player each the second portion 122 and a different game player holding the first portion 122. The computing system 102 is able to recognize this particular operating state of the user-input control device 108, because the computing system separately tracks and models the game player 106, the second game player 1100, the first portion 120 of the user-input control device, and the second portion 122 of the user-input control device.

As exemplified in FIGS. 9-12, actuation of the same button, trigger, dial, switch, joystick, directional pad, or other input mechanism (e.g., input mechanism 900) may result in different operations. The operation that is executed responsive to actuation of a button push may be a function of the attached/detached state of the control device and/or the identity of a player performing the actuation.

The above described approach for mapping different operations to input mechanisms of the user-input control device may provide flexibility to accommodate different gaming and other interaction scenarios. For example, the above described approach may allow users to start or stop playing a video game without interrupting a state of play. Rather, the computing system may automatically adjust a control scheme of the user-input control device responsive to recognizing that different game players are holding different portions of the user-input control device. Further, the computing system may automatically re-adjust the control scheme to a single player state when the second game player hands the portion of the user-input control device back to the other game player.

Moreover, the above described approach may be employed to customize the control scheme of each portion of user-input control device according to an identity of a user that is holding the portion. In particular, since the computing system tracks and models each game player, the computing system may be able to recognize an identity of a game player and associate the identity with a portion of a user-input control device while the game player is holding the portion. Further, various information may be associated with the identity, such as a preferred control scheme of a user-input control device, and the control scheme may be applied to the portion of the user-input control device.

Figure 13:
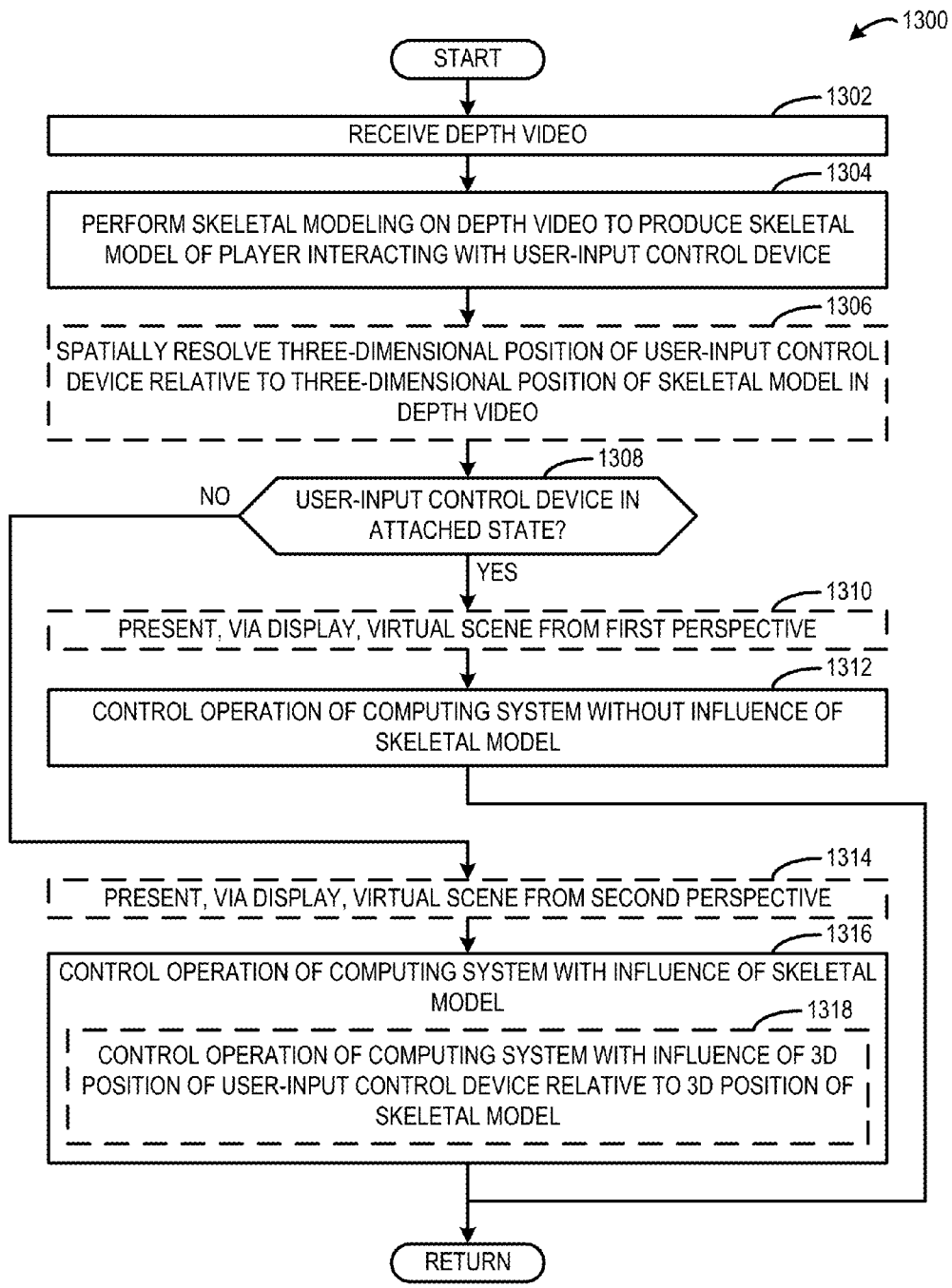
FIG. 13 show an example method for controlling operation of a computing system based on an operating state of a user-input control device.

FIG. 13 show an example method 1300 for controlling operation of a computing system based on an operating state of a user-input control device. In one example, the method 1300 may be performed by the computing system 102 shown in FIGS. 1 and 2. In another example, the method 1300 may be performed by the computing system 1500 shown in FIG. 15.

At 1302, the method 1300 may include receiving depth video. For example, depth video may be received from a tracking device, such as the tracking device 110 shown in FIG. 1.

At 1304, the method 1300 may include performing skeletal modeling on the depth video to produce a skeletal model of a player interacting with a user-input control device. In some implementations, such modeling may include performing modeling of the user-input control device to produce a machine-readable representation of the user-input control device in addition to modeling the player.

At 1306, the method 1300 optionally may include spatially resolving a 3D position of the user-input control device relative to a 3D position of the skeletal model in the depth video.

At 1308, the method 1300 may include determining whether the user-input control device is in an attached state or a detached state. If the user-input control device is in the attached state, then the method 1300 moves to 1310. Otherwise, the method 1300 moves to 1314. In some implementations, the operating state of the user-input control device may be determined based on a signal received from the user-input control device that indicates the operating state. In other implementations, the operating state of the user-input control device may be determined by spatially resolving a 3D position of a first portion of the user-input control device in the depth video, spatially resolving a 3D position of a second portion of the user-input control device in the depth video, and determining whether the user-input control device is in the attached state or the detached state based on the 3D position of the first portion relative to the 3D position of the second portion. For example, the user-input control device may be determined to be in the detached state if a distance between the 3D positions of the first and second portions is greater than a threshold distance.

At 1310, the method 1300 optionally may include presenting, via a display, a virtual scene from a first perspective while the user-input control device is in the attached state.

At 1312, the method 1300 may include controlling operation of the computing system without influence of the skeletal model responsive to receiving a control signal from the user-input control device while the user-input control device is in the attached state. For example, operation of the computing system may be controlled based only on user input provided to input mechanisms of the user-input control device. In one example, the control signal may be associated with an input mechanism of the user-input control device, and controlling operation may include performing an operation mapped to the control signal.

At 1314, the method 1300 optionally may include presenting, via the display, the virtual scene from a second perspective different than the first perspective while the user-input control device is in the detached state. For example, the perspective of the virtual scene may automatically change responsive to the user-input control device switching between the attached state and the detached state.

At 1316, the method 1300 may include controlling operation of the computing system with influence of the skeletal model responsive to receiving the control signal from the user-input control device while the user-input control device is in the detached state. For example, controlling operation of the computing system with influence of the skeletal model may include recognizing a gesture performed by a body part of the skeletal model and performing an operation associated with the gesture.

In some implementations, while the user-input control device is in the detached state, operation of the computing system may be controlled without influence of operations mapped to control signals associated with input mechanisms of the user-input control device. In other words, user input provided to user input mechanisms (e.g., button presses) may be ignored by the computing system while the user-input control device is in the detached state. In some implementations, at least some user input mechanisms may have different functions depending on the attached/detached state of the user-input control device.

At 1318, the method 1300 optionally may include controlling operation of the computing system with influence of the 3D position of the user-input control device relative to the 3D position of the skeletal model.

Figure 14:
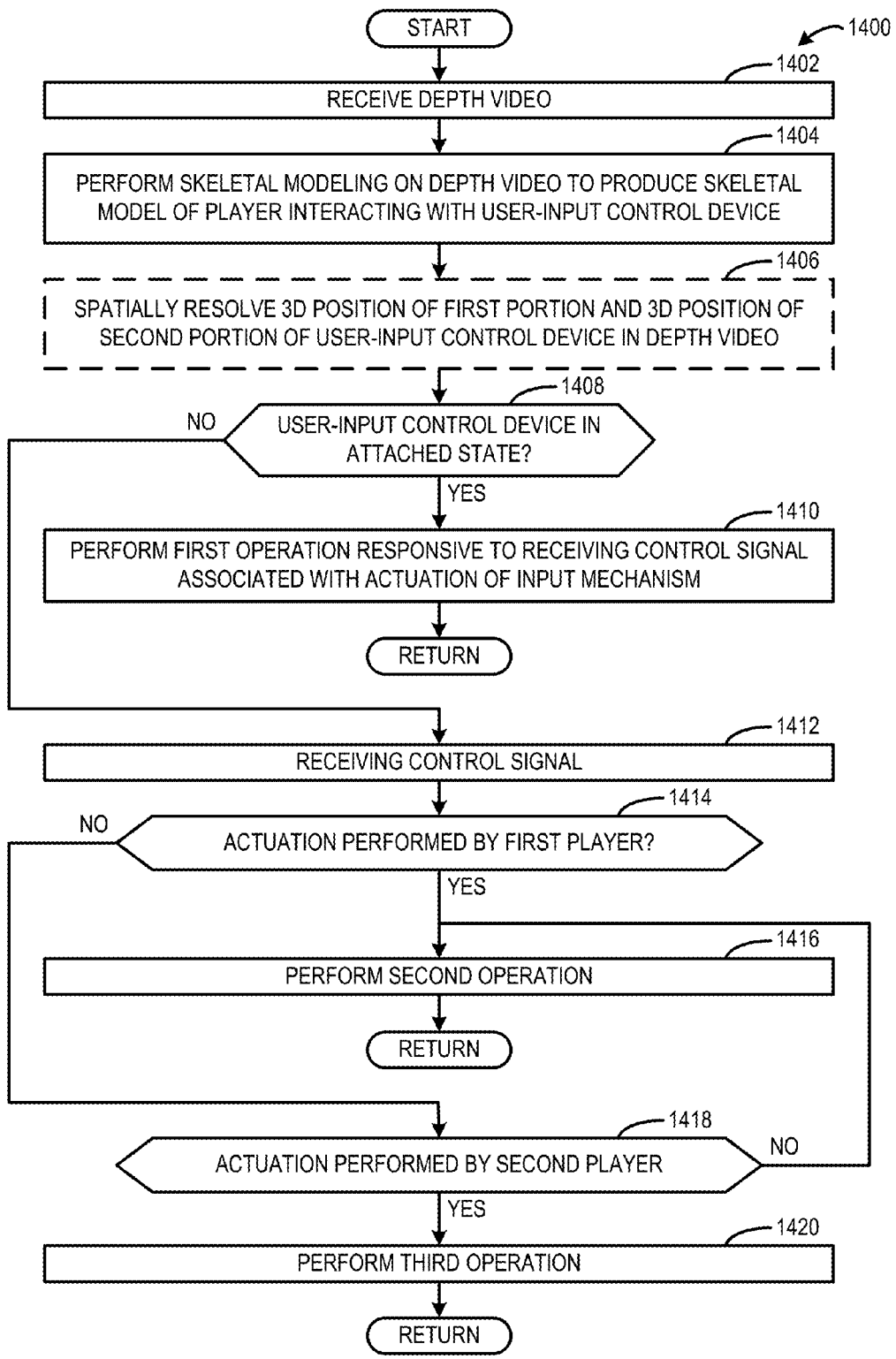
FIG. 14 show another example method for controlling operation of a computing system based on an operating state of a user-input control device.

FIG. 14 show another example method 1400 for controlling operation of a computing system based on an operating state of a user-input control device. In one example, the method 1400 may be performed by the computing system 102 shown in FIGS. 1 and 2. In another example, the method 1400 may be performed by the computing system 1500 shown in FIG. 15.

At 1402, the method 1400 may include receiving depth video.

At 1404, the method 1400 may include performing skeletal modeling on the depth video to produce a first skeletal model of a first player and a second skeletal model of a second player.

At 1406, the method 1400 optionally may include spatially resolving a 3D position of a first portion of user-input control device and a 3D position of the second portion of the user-input control device in the depth video.

At 1408, the method 1400 may include determining whether the user-input control device is in an attached state or a detached state. If the user-input control device is in the attached state, then the method 1400 moves to 1410. Otherwise, the method 1400 moves to 1412.

At 1410, the method 1400 may include performing a first operation responsive to receiving a control signal associated with an actuation of an input mechanism of the user-input control device while the user-input control device is in the attached state.

At 1412, the method 1400 may include receiving a control signal associated with an actuation of the input mechanism of the user-input control device while the user-input control device is in the detached state.

At 1414, the method 1400 may include determining whether the first player performed the actuation of the input mechanism. For example, the determination may be made based on a 3D position of the portion of the user-input control device that includes the input mechanism being located within or near a body region of the first skeletal model. For example, the body region of the first skeletal model may include a contiguous region of pixels in the depth video that are assigned to the first player. A body region of a player may be determined in any suitable manner. If the first player performed the actuation of the input mechanism, then the method 1400 moves to 1416. Otherwise, the method moves to 1418.

At 1416, the method 1400 may include performing a second operation different than the first operation responsive to receiving the control signal associated with an actuation of the input mechanism performed by the first player while the user-input control device is in the detached state.

At 1418, the method 1400 may include determining whether the second player performed the actuation of the input mechanism. For example, the determination may be made based on a 3D position of the portion of the user-input control device that includes the input mechanism being within or near a body region of the second skeletal model. If the second player performed the actuation of the input mechanism, then the method 1400 moves to 14120. Otherwise, the method 1400 moves to 1416. In other words, if it cannot be recognized that the second player performed the actuation, then it is assumed that the first player is the only player controlling operation of the computing system.

At 1420, the method 1400 may include performing a third operation different than the first operation and the second operation responsive to receiving the control signal associated with an actuation of the input mechanism performed by the second player while the user-input control device is in the detached state.

In some embodiments, the methods and processes described herein may be tied to a computing system of one or more computing devices. In particular, such methods and processes may be implemented as a computer-application program or service, an application-programming interface (API), a library, and/or other computer-program product.

Figure 15:
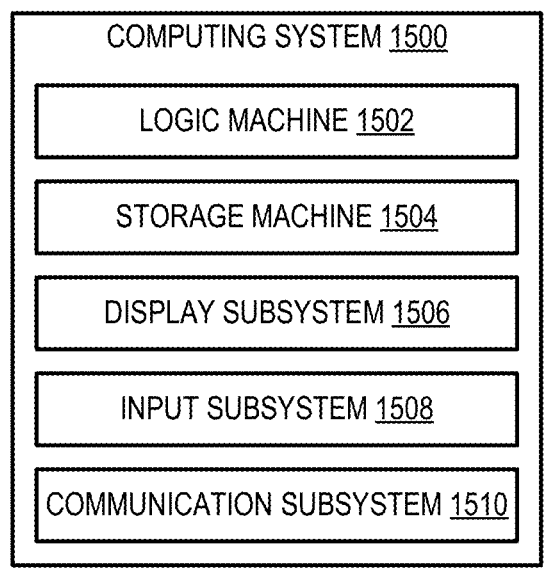
FIG. 15 shows an example computing system.

FIG. 15 schematically shows a non-limiting embodiment of a computing system 1500 that can enact one or more of the methods and processes described above. Computing system 1500 is shown in simplified form. Computing system 1500 may take the form of one or more personal computers, server computers, tablet computers, home-entertainment computers, network computing devices, gaming devices, mobile computing devices, mobile communication devices (e.g., smart phone), and/or other computing devices. For example, computing system 1500 may be representative of computing system 102 shown in FIGS. 1 and 2.

Computing system 1500 includes a logic machine 1502 and a storage machine 1504. Computing system 1500 may optionally include a display subsystem 1506, input subsystem 1508, communication subsystem 1510, and/or other components not shown in FIG. 1500.

Logic machine 1502 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1504 includes one or more physical devices configured to hold instructions executable by the logic machine to implement the methods and processes described herein. When such methods and processes are implemented, the state of storage machine 1504 may be transformed—e.g., to hold different data.

Storage machine 1504 may include removable and/or built-in devices. Storage machine 1504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1504 may include volatile, nonvolatile, dynamic, static, read/write, read-only, random-access, sequential-access, location-addressable, file-addressable, and/or content-addressable devices.

It will be appreciated that storage machine 1504 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1502 and storage machine 1504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1500 implemented to perform a particular function. In some cases, a module, program, or engine may be instantiated via logic machine 1502 executing instructions held by storage machine 1504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1506 may be used to present a visual representation of data held by storage machine 1504. This visual representation may take the form of a graphical user interface (GUI). As the herein described methods and processes change the data held by the storage machine, and thus transform the state of the storage machine, the state of display subsystem 1506 may likewise be transformed to visually represent changes in the underlying data. Display subsystem 1506 may include one or more display devices utilizing virtually any type of technology. Such display devices may be combined with logic machine 1502 and/or storage machine 1504 in a shared enclosure, or such display devices may be peripheral display devices.

When included, input subsystem 1508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1510 may be configured to communicatively couple computing system 1500 with one or more other computing devices. Communication subsystem 1510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1500 to send and/or receive messages to and/or from other devices via a network such as the Internet.

One example provides, on a computing system, a method comprising receiving a depth video, producing a machine-understandable model of a player interacting with a user-input control device from the depth video, controlling operation of the computing system without influence of the machine-understandable model responsive to receiving a control signal from a user-input control device while the user-input control device is in an attached state, and controlling operation of the computing system with influence of the machine-understandable model responsive to receiving the control signal from the user-input control device while the user-input control device is in a detached state. In such an example, the method optionally further comprises receiving, from the user-input control device, a signal indicating whether the user-input control device is in the attached state or the detached state. In such an example, the method optionally further comprises spatially resolving a three-dimensional position of a first portion of the user-input control device in the depth video, spatially resolving a three-dimensional position of a second portion of the user-input control device in the depth video, and determining whether the user-input control device is in the attached state or the detached state based on the three-dimensional position of the first portion relative to the three-dimensional position of the second portion. In such an example, controlling operation of the computing system with influence of the machine-understandable model optionally includes recognizing a gesture performed by a body part of the machine-understandable model and performing an operation associated with the gesture. In such an example, the method optionally further comprises spatially resolving a three-dimensional position of the user-input control device relative to a three-dimensional position of the machine-understandable model in the depth video, and controlling operation of the computing system with influence of the three-dimensional position of the user-input control device relative to the three-dimensional position of the machine-understandable model responsive to receiving a control signal from the user-input control device while the user-input control device is in the detached state. In such an example, the control signal optionally is associated with an input mechanism of the user-input control device, and the method optionally further comprises performing an operation mapped to the control signal while the user-input control device is in the detached state. In such an example, the control signal optionally is associated with an input mechanism of the user-input control device, and operation of the computing system optionally is controlled without influence of an operation mapped to the control signal while the user-input control device is in the detached state. In such an example, the control signal optionally is associated with an input mechanism of the user-input control device, and the method optionally further comprises performing a first operation responsive to receiving the control signal while the user-input control device is in the attached state, and performing a second operation different than the first operation responsive to receiving the control signal while the user-input control device is in the detached state. In such an example, the method optionally further comprises presenting, via a display, a virtual scene from a first perspective while the user-input control device is in the attached state, and presenting, via the display, the virtual scene from a second perspective different than the first perspective while the user-input control device is in the detached state. Any or all of the above-described examples may be combined in any suitable manner in various implementations.

Another example provides a computing system comprising a means for receiving a depth video, a means for producing a machine-understandable model of a player interacting with a user-input control device from the depth video, a means for controlling operation of the computing system without influence of the machine-understandable model responsive to receiving a control signal from a user-input control device while the user-input control device is in an attached state, and a means for controlling operation of the computing system with influence of the machine-understandable model responsive to receiving the control signal from the user-input control device while the user-input control device is in a detached state. In such an example, the computing system optionally further comprises a means for receiving, from the user-input control device, a signal indicating whether the user-input control device is in the attached state or the detached state. In such an example, the computing system optionally further comprises a means for spatially resolving a three-dimensional position of a first portion of the user-input control device in the depth video, a means for spatially resolving a three-dimensional position of a second portion of the user-input control device in the depth video, and a means for determining whether the user-input control device is in the attached state or the detached state based on the three-dimensional position of the first portion relative to the three-dimensional position of the second portion. In such an example, controlling operation of the computing system with influence of the machine-understandable model optionally includes recognizing a gesture performed by a body part of the machine-understandable model and performing an operation associated with the gesture. In such an example, the computing system optionally further comprises a means for spatially resolving a three-dimensional position of the user-input control device relative to a three-dimensional position of the machine-understandable model in the depth video, and a means for controlling operation of the computing system with influence of the three-dimensional position of the user-input control device relative to the three-dimensional position of the machine-understandable model responsive to receiving a control signal from the user-input control device while the user-input control device is in the detached state. In such an example, the control signal optionally is associated with an input mechanism of the user-input control device, and the computing system optionally further comprises a means for performing an operation mapped to the control signal while the user-input control device is in the detached state. In such an example, the control signal optionally is associated with an input mechanism of the user-input control device, and operation of the computing system optionally is controlled without influence of an operation mapped to the control signal while the user-input control device is in the detached state. In such an example, the control signal optionally is associated with an input mechanism of the user-input control device, and the computing system optionally further comprises a means for performing a first operation responsive to receiving the control signal while the user-input control device is in the attached state, and a means for performing a second operation different than the first operation responsive to receiving the control signal while the user-input control device is in the detached state. In such an example, the computing system optionally further comprises a means for presenting, via a display, a virtual scene from a first perspective while the user-input control device is in the attached state, and a means for presenting, via the display, the virtual scene from a second perspective different than the first perspective while the user-input control device is in the detached state. Any or all of the above-described examples may be combined in any suitable manner in various implementations.

Another example provides a computing system comprising a logic machine, a storage machine holding instruction executable by the logic machine to receive a depth video, perform skeletal modeling on the depth video to produce a skeletal model of a player interacting with a user-input control device, spatially resolve a three-dimensional position of the user-input control device relative to a three-dimensional position of the skeletal model in the depth video, and control operation of the computing system with influence of the three-dimensional position of the user-input control device relative to the three-dimensional position of the skeletal model responsive to receiving a control signal from the user-input control device while the user-input control device is in a detached state. In such an example, the storage machine optionally further holds instructions executable by the logic machine to control operation of the computing system without influence of the three-dimensional position of the user-input control device relative to the three-dimensional position of the skeletal model responsive to receiving a control signal from the user-input control device while the user-input control device is in an attached state. In such an example, the control signal optionally is associated with an input mechanism of the user-input control device, and the storage machine optionally further holds instructions executable by the logic machine to perform an operation mapped to the control signal while the user-input control device is in the attached state. In such an example, the control signal optionally is associated with an input mechanism of the user-input control device, and the storage machine optionally further holds instructions executable by the logic machine to perform a first operation responsive to receiving the control signal while the user-input control device is in the attached state, and perform a second operation different than the first operation responsive to receiving the control signal while the user-input control device is in the detached state. In such an example, the storage machine optionally further holds instructions executable by the logic machine to control operation of the computing system with influence of the three-dimensional position of the user-input control device relative to the three-dimensional position of the skeletal model responsive to receiving a control signal from the user-input control device while the user-input control device is in an attached state. In such an example, the control signal optionally is associated with an input mechanism of the user-input control device, and the storage machine optionally further holds instructions executable by the logic machine to perform an operation mapped to the control signal while the user-input control device is in the attached state. In such an example, the control signal optionally is associated with an input mechanism of the user-input control device, and operation of the computing system optionally is controlled without influence of an operation mapped to the control signal while the user-input control device is in the detached state. In such an example, the storage machine optionally further holds instructions executable by the logic machine to present, via a display, a virtual scene from a first perspective while the user-input control device is in an attached state, and present, via the display, the virtual scene from a second perspective different than the first perspective while the user-input control device is in the detached state. In such an example, the storage machine optionally further holds instructions executable by the logic machine to receive, from the user-input control device, a signal indicating whether the user-input control device is in the attached state or the detached state. In such an example, the storage machine optionally further holds instructions executable by the logic machine to spatially resolve a three-dimensional position of a first portion of the user-input control device in the depth video, spatially resolve a three-dimensional position of a second portion of the user-input control device in the depth video, and determine whether the user-input control device is in the attached state or the detached state based on the three-dimensional position of the first portion relative to the three-dimensional position of the second portion. Any or all of the above-described examples may be combined in any suitable manner in various implementations.

Another example provides, on a computing system, a method comprising receiving a depth video, performing skeletal modeling on the depth video to produce a first skeletal model of a first player and a second skeletal model of a second player, performing a first operation responsive to receiving a control signal associated with an actuation of an input mechanism of the user-input control device while the user-input control device is in an attached state, performing a second operation different than the first operation responsive to receiving the control signal while the user-input control device is in a detached state and the actuation is performed by the first player, and performing a third operation different than the first operation and the second operation responsive to receiving the control signal while the user-input control device is in the detached state and the actuation is performed by the second player.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing system, a method comprising:
receiving a depth video;
producing a machine-understandable model of a player interacting with a user-input control device from the depth video, the machine-understandable model indicating a three dimensional position of the player;
spatially resolve the three-dimensional position of the machine-understandable model relative to a three-dimensional position of the user-input control device;
controlling operation of the computing system without influence of the machine-understandable model responsive to receiving a control signal from a user-input control device while the user-input control device is in an attached state; and
controlling operation of the computing system with influence of the machine-understandable model responsive to receiving the control signal from the user-input control device while the user-input control device is in a detached state.

2. The method of claim 1, further comprising:
receiving, from the user-input control device, a signal indicating whether the user-input control device is in the attached state or the detached state.

3. The method of claim 1, further comprising:
spatially resolving a three-dimensional position of a first portion of the user-input control device in the depth video;
spatially resolving a three-dimensional position of a second portion of the user-input control device in the depth video; and
determining whether the user-input control device is in the attached state or the detached state based on the three-dimensional position of the first portion relative to the three-dimensional position of the second portion.

4. The method of claim 1, wherein controlling operation of the computing system with influence of the machine-understandable model includes recognizing a gesture performed by a body part of the machine-understandable model and performing an operation associated with the gesture.

5. method of claim 1, further comprising:
controlling operation of the computing system with influence of the three-dimensional position of the user-input control device relative to the three-dimensional position of the machine-understandable model responsive to receiving the control signal from the user-input control device while the user-input control device is in the detached state.

6. The method of claim 1, wherein the control signal is associated with an input mechanism of the user-input control device, and wherein the method further comprises performing an operation mapped to the control signal while the user-input control device is in the detached state.

7. The method of claim 1, wherein the control signal is associated with an input mechanism of the user-input control device, and wherein operation of the computing system is controlled without influence of an operation mapped to the control signal while the user-input control device is in the detached state.

8. The method of claim 1, wherein the control signal is associated with an input mechanism of the user-input control device, and the method further comprises:
performing a first operation responsive to receiving the control signal while the user-input control device is in the attached state; and
performing a second operation different than the first operation responsive to receiving the control signal while the user-input control device is in the detached state.

9. The method of claim 1, further comprising:
presenting, via a display, a virtual scene from a first perspective while the user-input control device is in the attached state; and
presenting, via the display, the virtual scene from a second perspective different than the first perspective while the user-input control device is in the detached state.

10. A computing system comprising:
a logic machine;
a storage machine holding instruction executable by the logic machine to: receive a depth video;
perform skeletal modeling on the depth video to produce a skeletal model of a player interacting with a user-input control device;

spatially resolve a three-dimensional position of the user-input control device relative to a three-dimensional position of the skeletal model in the depth video; and control operation of the computing system with influence of the three-dimensional position of the user-input control device relative to the three-dimensional position of the skeletal model responsive to receiving a control signal from the user-input control device while the user-input control device is in a detached state.

11. The computing system of claim 10, wherein the storage machine further holds instructions executable by the logic machine to:

control operation of the computing system without influence of the three-dimensional position of the user-input control device relative to the three-dimensional position of the skeletal model responsive to receiving a control signal from the user-input control device while the user-input control device is in an attached state.

12. The computing system of claim 11, wherein the control signal is associated with an input mechanism of the user-input control device, and wherein the storage machine further holds instructions executable by the logic machine to:

perform an operation mapped to the control signal while the user-input control device is in the attached state.

13. The computing system of claim 12, wherein the control signal is associated with an input mechanism of the user-input control device, and wherein the storage machine further holds instructions executable by the logic machine to:

perform a first operation responsive to receiving the control signal while the user-input control device is in the attached state; and perform a second operation different than the first operation responsive to receiving the control signal while the user-input control device is in the detached state.

14. The computing system of claim 10, wherein the storage machine further holds instructions executable by the logic machine to:

control operation of the computing system with influence of the three-dimensional position of the user-input control device relative to the three-dimensional position of the skeletal model responsive to receiving a control signal from the user-input control device while the user-input control device is in an attached state.

15. The computing system of claim 14, wherein the control signal is associated with an input mechanism of the user-input control device, and wherein the storage machine further holds instructions executable by the logic machine to:

perform an operation mapped to the control signal while the user-input control device is in the attached state.

16. The computing system of claim 14, wherein the control signal is associated with an input mechanism of the user-input control device, and wherein operation of the computing system is controlled without influence of an operation mapped to the control signal while the user-input control device is in the detached state.

17. The computing system of claim 10, wherein the storage machine further holds instructions executable by the logic machine to:

present, via a display, a virtual scene from a first perspective while the user-input control device is in an attached state; and present, via the display, the virtual scene from a second perspective different than the first perspective while the user-input control device is in the detached state.

18. The computing system of claim 10, wherein the storage machine further holds instructions executable by the logic machine to:

receive, from the user-input control device, a signal indicating whether the user-input control device is in the attached state or the detached state.

19. The computing system of claim 10, wherein the storage machine further holds instructions executable by the logic machine to:

spatially resolve a three-dimensional position of a first portion of the user-input control device in the depth video;

spatially resolve a three-dimensional position of a second portion of the user-input control device in the depth video; and determine whether the user-input control device is in the attached state or the detached state based on the three-dimensional position of the first portion relative to the three-dimensional position of the second portion.

20. On a computing system, a method comprising:

receiving a depth video;

performing skeletal modeling on the depth video to produce a first skeletal model of a first player and a second skeletal model of a second player;

performing a first operation responsive to receiving a control signal associated with an actuation of an input mechanism of the user-input control device while the user-input control device is in an attached state;

performing a second operation different than the first operation responsive to receiving the control signal while the user-input control device is in a detached state and the actuation is performed by the first player; and performing a third operation different than the first operation and the second operation responsive to receiving the control signal while the user-input control device is in the detached state and the actuation is performed by the second player.

* * * * *